(12) United States Patent
Bohmer et al.

(10) Patent No.: US 6,819,049 B1
(45) Date of Patent: Nov. 16, 2004

(54) ELECTRIC LAMP

(75) Inventors: Marcel Rene Bohmer, Eindhoven (NL); Ingrid Jozef Maria Snijkers-Hendrickx, Eindhoven (NL); Paulina Maria Christina Neilen-Ten Wolde, Eindhoven (NL); Theodora Antonia Petra Maria Keursten, Eindhoven (NL); Remy Cyrille Broersma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 52 days.

(21) Appl. No.: 09/656,987

(22) Filed: Sep. 7, 2000

(30) Foreign Application Priority Data

Sep. 13, 1999 (EP) ............................................. 99202979

(51) Int. Cl.[7] ................................................. H01J 5/16
(52) U.S. Cl. ....................................... 313/635; 313/112
(58) Field of Search ................................ 313/112, 635, 313/110, 479

(56) References Cited

U.S. PATENT DOCUMENTS 5,359,255 A * 10/1994 Kawai et al. ................ 313/113
5,578,892 A * 11/1996 Whitman et al. ............ 313/112
5,863,321 A * 1/1999 Crumley et al. ............. 106/404
6,129,980 A * 10/2000 Tsukada et al. .............. 313/479

FOREIGN PATENT DOCUMENTS

CA 766196 A 8/1967 .................. 117/186

* cited by examiner

Primary Examiner—Joseph Williams

(57) ABSTRACT

The electric lamp comprises a lamp vessel (1) which is transparent to visible light and which accommodates a light source. At least a part of the lamp vessel (1) is covered with a light-absorbing coating (3). According to the invention, the light-absorbing coating (3) comprises a network which can be obtained by conversion of an organically modified silane by a sol-gel process. The organically modified silane is selected from the group formed by compounds of structural formula $R'Si(OR")_3$, wherein $R'$ is an alkyl or aryl group and $R"$ is an alkyl group. Preferably, $R'$ is $CH_3$ or $C_6H_5$ and $R"$ is $CH_3$ or $C_2H_5$. Nano-sized silica particles having a diameter $d \leq 50$ nm may be incorporated in the network. The pigment is preferably chosen from the group formed by $Fe_2O_3$, P-doped $Fe_2O_3$, $ZnFe_2O_4$, $ZnO.Fe_2O_4$, $CoAl_2O_4$, $Nd_2O_5$, $BiVO_4$ and zirconium praseodymium silicate or mixtures thereof. The light-absorbing coating (3) of the electric lamp according to the invention is optically transparent, substantially free of scattering and stable at temperatures up to 350° C.

20 Claims, 3 Drawing Sheets

US 6,819,049 B1

ELECTRIC LAMP

BACKGROUND OF THE INVENTION

1. The Field of the Invention

The invention generally relates to an electric lamp. The invention specifically relates to a light-transmitting lamp vessel, which accommodates a light source for emitting a visible light and has a light-absorbing coating for absorbing part of the visible light.

2. Description of the Related Art

Such electric lamps are predominantly used as indicator lamps in vehicles, for example as an amber-colored light source in indicators or as a red-colored light source in brake lights of automobiles. Alternative embodiments of such lamps, wherein the color temperature is increased by a light-absorbing coating, can also be used as headlamps of a vehicle. The light-absorbing coatings are also used as a color layer on (incandescent) lamps for general lighting purposes. The electric lamps can also be used in traffic lights.

A known electric lamp disclosed in Canadian Patent No. CA-A 0 766 196 has a coating applied to the lamp vessel, which coating comprises a substance which absorbs visible light, for example a dye and/or a pigment.

For the application of the coatings, use is generally made of organic lacquers. The organic lacquer forms a kind of carrier matrix containing the pigment or the dye. The organic lacquer enables, inter alia, a good adhesion of the coating to the lamp vessel to be obtained. In the known lamp, use is made of a polymethylmethacrylate polymer, which is applied to the lamp vessel by a dip coating. In an alternative embodiment, a lacquer of a polyester silicone is applied to the lamp vessel by a spraying process. Moreover, use is often made of organic dyes, such as a dye called Zapon 157. Such dyes are added to the lacquer layer to obtain the desired color point.

It is a drawback of the known electric lamp comprising a light-absorbing coating on the basis of an organic lacquer that the adhesion of the coating to the lamp vessel deteriorates substantially and/or the organic dye degrades at temperatures above approximately 220° C. At temperatures close to or higher than the temperature, there is an increased risk that the coating cracks and/or becomes detached from the lamp vessel. Since the dimensions of the luminaires accommodating the electric lamp decrease continuously as do the dimensions of the electric lamp itself, the temperature of the lamp vessel provided with the coating currently reaches a temperature of 250° C. In addition, there is a trend towards further miniaturization, so that the lamp vessel provided with the light-absorbing coating reaches temperatures of approximately 325° C.

SUMMARY OF THE INVENTION

It is an object of the invention to provide an electric lamp to address the above drawbacks of the prior art.

In accordance with the invention, an electric lamp is characterized in that a light-absorbing coating comprises a network which can be obtained by conversion of an organically modified silane by a sol-gel process, and the organically modified silane is selected from the group formed by compounds of the following structural formula: $R'Si(OR'')_3$, wherein R' comprises an alkyl group or an aryl group, and wherein R" comprises an alkyl group.

By replacing the organic lacquer in the light-absorbing layer in the known electric lamp by a network comprising an organically modified silane as the starting material, an optically transparent, non-scattering, light-absorbing coating is obtained which can resist temperatures up to 400° C. By using an organically modified silane in the manufacture of the network, a part of the R' groups, i.e. the alkyl or aryl groups, remain present as an end group in the network. As a result, instead of four network bonds per Si atom, the network in accordance with the invention has fewer than four network bonds per Si atom. This results, by way of example, in a network comprising, on average, approximately three network bonds per Si atom. Despite the fact that the network is partly composed of the alkyl or aryl groups, a network is obtained whose density is at least substantially equal to that of the customary silica network. Unlike the customarily used silica network, a network which is partly composed of the alkyl or aryl groups has a greater elasticity and flexibility. This enables relatively thick light-absorbing coatings to be manufactured.

Preferably, the R' group comprises $CH_3$ or $C_6H_5$. These substances have a relatively good thermal stability. A network comprising methyl or phenyl groups enables thicker coatings to be obtained. Experiments have further shown that coatings wherein methyl or phenyl groups are incorporated in a network are stable up to a temperature of at least 350° C. the groups are end groups in the network and remain part of the network at the higher temperatures. At such a relatively high temperature load on the light-absorbing coating, no appreciable degradation of the network occurs during the service life of the electric lamp.

Preferably, the R" group comprises $CH_3$ or $C_2H_5$. Methyl and ethyl groups are particularly suitable because methanol and ethanol are formed in the hydrolysis process, which substances are compatible with the pigment dispersion and evaporate relatively easily. In general, the methoxy groups ($—OCH_3$) react more rapidly than the ethoxy groups ($—OC_2H_5$) which, in turn, react more rapidly than (iso)propoxy groups ($—OC_3H_7$). For a smooth hydrolysis process, use is advantageously made of R" groups which are not very long.

Very suitable starting materials for the manufacture of the network in accordance with the invention are (1) methyltrimethoxy silane (MTMS), where $R'=R''=CH_3$, (2) methyltriethoxy silane (MTES), where $R'=CH_3$ and $R''=C_2H_5$, (3) phenyltrimethoxy silane (PTMS), where $R'=C_6H_5$ and $R''=CH_3$, and (4) phenyltriethoxy silane (PTES), where $R'=C_6H_5$ and $R''=C_2H_5$. Such starting materials are known per se and commercially available.

An embodiment of the electric lamp in accordance with the invention is characterized in that the thickness $t_c$ of the light-absorbing coating is $t_c \geq 1$ μm. If use is made of a network composed of silica, which comprises four network bonds per Si atom, the thickness of the coating is limited, under atmospheric conditions, to approximately at most 0.5 μm. In such silica layers whose thickness exceeds the thickness, stress in the layer readily leads to cracks and/or the coating readily becomes detached from the lamp vessel. By using a network comprising fewer than four network bonds per Si atom, a much thicker layer thickness can be attained. Preferably, $t_c \geq 2$ μm. In thicker, light-absorbing coatings, more pigment or dye can be incorporated, whereby the color effect of the coating is improved.

Inorganic filling materials may be incorporated in the light-absorbing coating. For this purpose, in a favorable embodiment of the electric lamp in accordance with the invention, silica particles having a diameter $d \geq 50$ nm are incorporated in the network. Incorporation of these so-called nano-sized silica particles reduces shrinkage of the layer during the manufacture thereof. In addition, the incorporation of the nano-sized silica particles makes it possible to obtain even thicker coatings which bond well to the lamp vessel. By adding nano-sized silica particles to a network, wherein alkyl or aryl groups, which form the R' groups, are present as the end group, 20 μm thick layers having favorable bonding properties can be obtained. Such thick layers can contain considerable quantities of a pigment or a dye to obtain the desired color point of the light-absorbing coating. By incorporating the silica particles it becomes possible to manufacture light-absorbing coatings in a larger thickness. The refractive index of such a coating is less influenced by the refractive index of the pigment when the same quantity of pigment is incorporated in a thicker coating. The use of the silica particles thus results in a certain degree of freedom to bring the refractive index of the light-absorbing coating to a desired value and maintain the refractive index at the value.

To manufacture light-absorbing coatings having the desired optical properties, the coatings having the desired thermal stability during the service life of the electric lamp, use is preferably made of inorganic pigments. In a favorable embodiment of the electric lamp in accordance with the invention, the pigment is selected from the group formed by iron oxide, iron oxide doped with phosphor, zinc-iron oxide, cobalt aluminate, neodymium oxide, bismuth vanadate, zirconium praseodymium silicate or mixtures thereof. Iron oxide ($Fe_2O_3$) is an orange pigment and P-doped $Fe_2O_3$ is an orange-rd pigment. Zinc-iron oxide, for example $ZnFe_2O_4$ or $ZnO.ZnFe_2O_4$ are yellow pigments. Mixing (P-doped) $Fe_2O_3$ with $ZnFe_2O_4$ yields a pigment of a deep orange color. Cobalt aluminate ($CoAl_2O_4$) and neodymium oxide ($Nd_2O_5$) are blue pigments. Bismuth vanadate ($BiVO_5$), also referred to as pucherite, is a yellow-green pigment. Zirconium praseodymium silicate is a yellow pigment. Experiments have shown that a network including the inorganic pigments does not appreciably degrade during the service life and at the relatively high temperature load on the light-absorbing coating.

In an alternative embodiment, light-absorbing coatings are obtained wherein organic pigments are used. Particularly suitable pigments are the so-called Red 177 (anthraquinone) or chromium phthalic yellow (2RLP) from "Ciba". Further suitable pigments are Red 149 (perylene), Red 122 (quinacridone), Red 257 (Ni-isoindoline), Violet 19 (quinacridone), Blue 15:1 (Cu-phthalocyanine), Green 7 (hal.Cu-phthalocyaninc) or Yellow 83 (dyaryl) from "Clariant". Also mixtures of inorganic and organic pigments are suitable, for example a mixture of chromium phthalic yellow and (zinc)iron oxide.

Preferably, an average diameter $d_p$ of the pigment particles is $d_p \leq 100$ nm. By using pigments of such relatively small dimensions, optically transparent coatings are obtained which exhibit relatively little light scattering. Since the electric lamp in accordance with the invention is often applied in specially designed reflectors, wherein the light source is embodied so as to be punctiform, light scattering by the light-absorbing coatings is an undesirable property. The effect of light scattering is at least substantially precluded if the average diameter of the pigment particles $d_p \leq 50$ nm.

In the literature, networks obtained by conversion of an organically modified silane are customarily used to manufacture light-scattering coatings. In this invention, however, the network is used, in particular, to manufacture transparent coatings exhibiting relatively little light scattering.

Particularly suitable electric lamps are obtained by applying a pigment in a light-absorbing coating, which pigment is composed of a mixture of iron oxide and bismuth vanadate, or of a mixture of iron oxide doped with phosphor and bismuth vanadate. Since bismuth vanadate often is only available in a particle size $d_p$, where $d_p > 100$ nm, a light-absorbing coating comprising such a pigment often exhibits a disturbing degree of light scattering. Inventors have found in experiments that the use of a combination of (P-doped) iron oxide and bismuth vanadate as the pigment causes the light scattering of the coating obtained to be reduced considerably as if the diameter of the bismuth vanadate particles is much smaller than 100 nm. Without being obliged to give any theoretical explanation, the decrease of the light scattering of such a coating is attributed to an increase of the refractive index of the network as a result of the presence of the iron oxide particles.

It has been found that an electric lamp comprising a lamp vessel which is coated in accordance with the invention with a light-absorbing coating comprising a network obtained by conversion of an organically modified silane by a sol-gel process preserves its initial properties to a substantial degree during the service life of the electric lamp.

These and other aspects of the invention will be apparent from and elucidated with reference to the embodiments described hereinafter.

BRIEF DESCRIPTION OF THE DRAWINGS

The Figures are purely schematic and not drawn to scale. Particularly for clarity, some dimensions are exaggerated strongly. In the Figures, like reference numerals refer to like parts whenever possible.

DETAILED DESCRIPTION OF THE INVENTION

Figure 1:
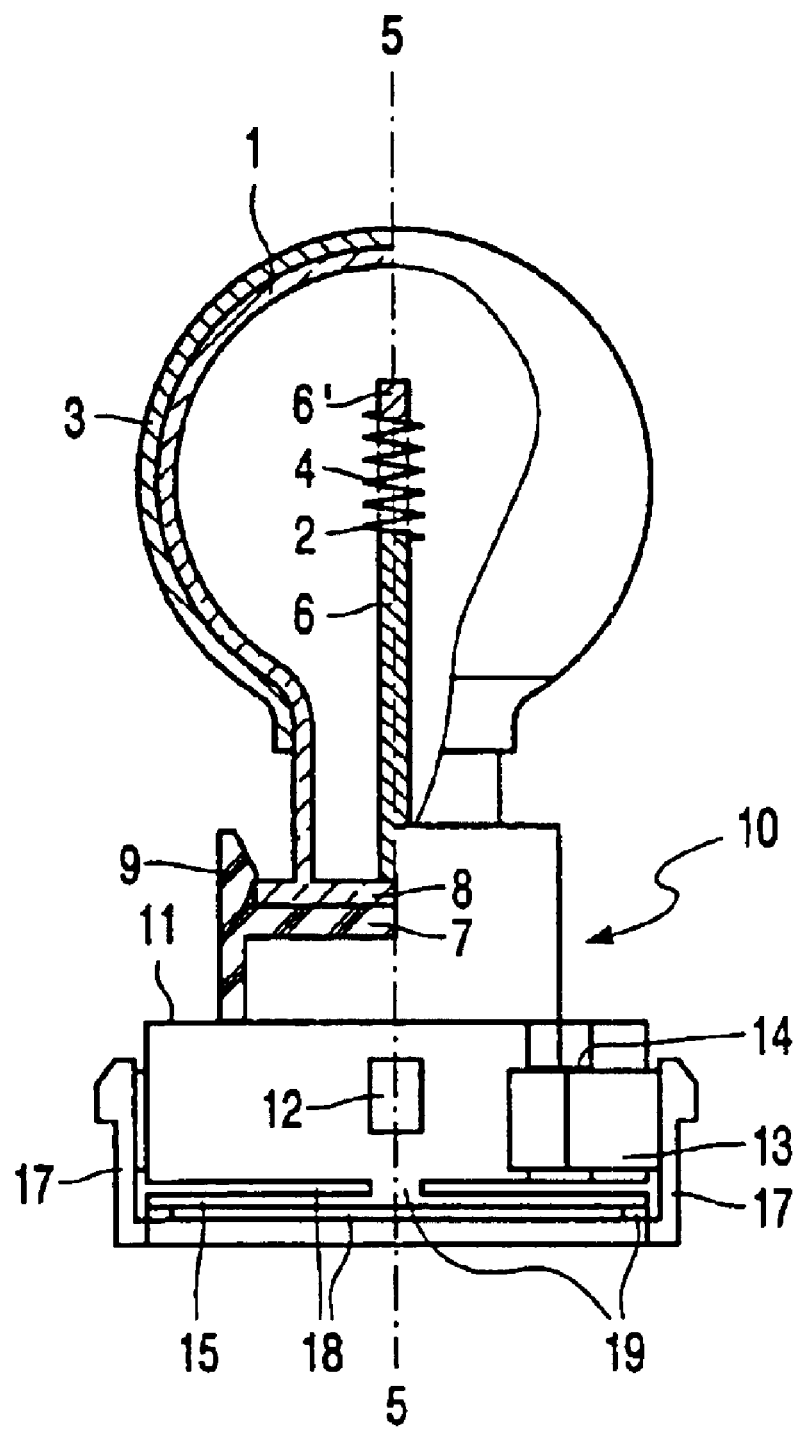
FIG. 1 is a side view, partly cut away and partly in cross-section, of an electric lamp in accordance with the invention comprising a lamp cap.

FIG. 1 shows an electric lamp in accordance with the invention, a part of which is shown in side view, partly cut away, and another part of which is shown in cross-section. The electric lamp comprises a light-transmitting lamp vessel 1, for example made of glass, which is closed in a gastight manner and in which an electric element 2, being a (spiral-shaped) tungsten incandescent body with a center 4 in the FIG. 1, is axially positioned on an axis 5 and is connected to current conductors 6 which issue from the lamp vessel 1 to the exterior. The lamp shown has a filling of an inert gas, for example an Ar/Ne mixture, with a filling pressure slightly above 5 bar.

A lamp cap 10 is firmly connected to the lamp vessel 1. The lamp cap 10 has a synthetic resin housing 11. The housing 11 comprises a flat base portion 7, which is at least substantially perpendicular to the axis 5. The lamp vessel 1 is closed off in a gastight manner by a plate 8 of an insulating material, which plate 8 lies in a plane which is at least substantially perpendicular to the axis 5. Electric element 2 is mounted in a previously defined position with respect to the plate 8 during the manufacture of the lamp. The plate 8 of the lamp vessel 1 is pressed home against the base portion by a lock 9, for example ridges, such that the electric element 2 will enter a previously defined position with respect to a reference 12, for example studs. The studs 12 form part of the lamp cap and are designed to abut against a support 30, for example a reflector, as is visible in FIG. 2.

The lamp cap also comprises contact members 14 which are provided with a screen 13 and to which the current conductors 6 of the lamp vessel 1 are connected. A resilient intermediate portion 15, which is provided with a coupler 17, resilient tags in the FIG. 2 designed for coupling the reflector 30 to the lamp cap 10, forms an integral whole with the housing 11. The resilient action of the intermediate portion 15 is obtained in that the intermediate portion 15 is made so as to be hollow, so that no more than a wall remains as the intermediate portion 15, whereupon a major portion of the wall is removed by a two grooves 18, which run perpendicularly to the axis 5. The remaining portion of the wall forms a bridge 19, which is rotated, near the next groove, through an angle of, for example, 180° about the axis 5.

The lamp vessel 1 of the electric lamp has a relatively small axial dimension of approximately 22 mm and is suitable for consuming a relatively high power of, for example, 5 to 25 W. The electric lamp has a service life of approximately 6000 hours in this case.

In accordance with the invention, at least a part of the lamp vessel 1 is covered with a light-absorbing coating 3 having an average thickness of 2–3 $\mu$m.

Figure 2:
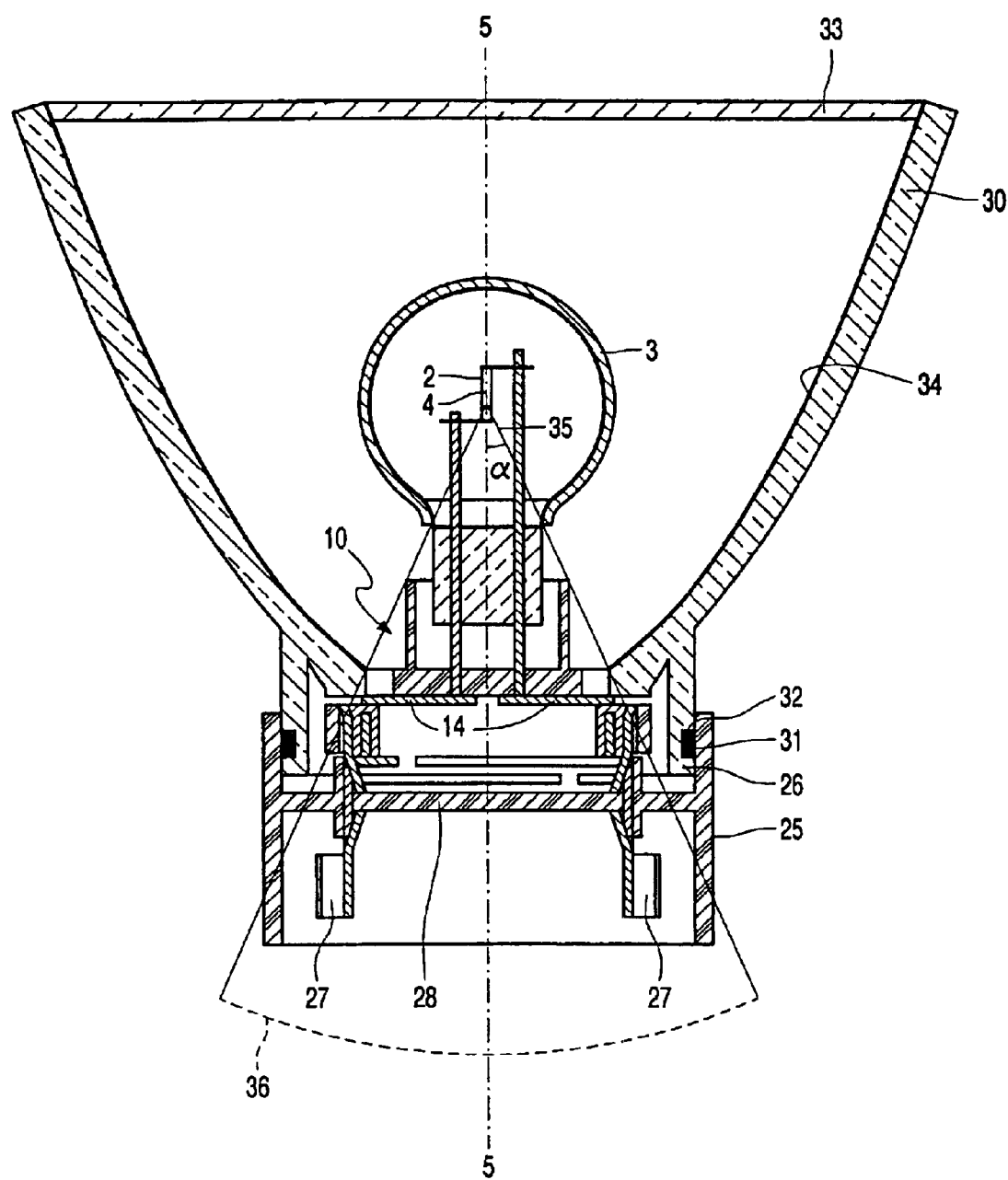
FIG. 2 shows an electric lamp provided with a reflector and an adapter.

FIG. 2 shows the electric lamp provided with a support 30, being a reflector with a transparent plate 33 in the drawing, as well as with an adapter 25. In this configuration of a lamp with an adapter and a reflector, where the reflector 30 is provided with a rubber ring 31 retained in a groove 32, the rubber ring 31 seals off the opening 26 between the lamp cap 10 and the reflector 30 in a gastight manner. The adapter 25 is provided with standardized contact points 27 which are passed through the bottom plate 28 of the adapter 25 in a gastight manner and are connected to contact members 14 of the lamp cap 10.

It is visible in the drawing that the lamp cap 10 falls substantially entirely within a cone 36, which has its apex 35 in the center 4 of the electric element 2 and has an apex half angle α of 25°. The light originating from the electric element 2 can reach the reflecting surface 34 substantially without obstruction and is reflected there at least substantially axially in the direction of the transparent plate 33.

EXAMPLE 1

A quantity of 10 g $ZnFe_2O_4$ (particle size 70 nm) is dispersed in a 50/50% water/ethanol mixture, using "disperbyk 190" as the dispersing agent. The overall weight of the mixture is 30 g. By a wet ball milling using 2 mm zirconium oxide grains, an optically clear liquid is obtained.

A quantity of 3 g $Fe_2O_3$ (particle size 40 nm) is dispersed in a corresponding manner.

A hydrolysis mixture of 40 g methyltrimethoxy silane (MTMS), 0.6 g tetraethylorthosilicate (TEOS), 32 g water, 4 g ethanol and 0.15 g glacial acetic acid is stirred for 48 hours at room temperature and, subsequently, stored in a refrigerator.

A coating liquid is prepared by mixing 10 g of the $ZnFe_2O_4$ dispersion, 6 g of the $Fe_2O_3$ dispersion and 10 g of the MTMS/TEOS hydrolysis mixture with 4 g methoxy propanol, which coating liquid is subsequently spray coated onto the outer surface of the major part of a lamp vessel. The coating is cured for 10 minutes at a temperature of 250° C.

In this manner, a light-absorbing coating in a thickness up to 3 $\mu$m is obtained on a glass lamp vessel without crack formation during drying and curing.

An electric lamp provided with a light-absorbing coating manufactured as described in this embodiment, is amber-colored, transparent and free of light scattering.

For a light-absorbing coating thus prepared, the color co-ordinate (x; y) in accordance with the definition of the C.I.E. 1931 color triangle diagram is (0.589; 0.405) at an overall transmission of 52% after the electric lamp has burned for 1 hour at 350° C. The color point of the coating is stable during the service life of the electric lamp.

The coating obtained in accordance with the recipe has a thickness of 2.7 $\mu$m. The weight fraction of the components in this coating is 52% $ZnFe_2O_4$ and $Fe_2O_3$, 18% "disperbyk 190", and 30% MTMS.

Figure 3:
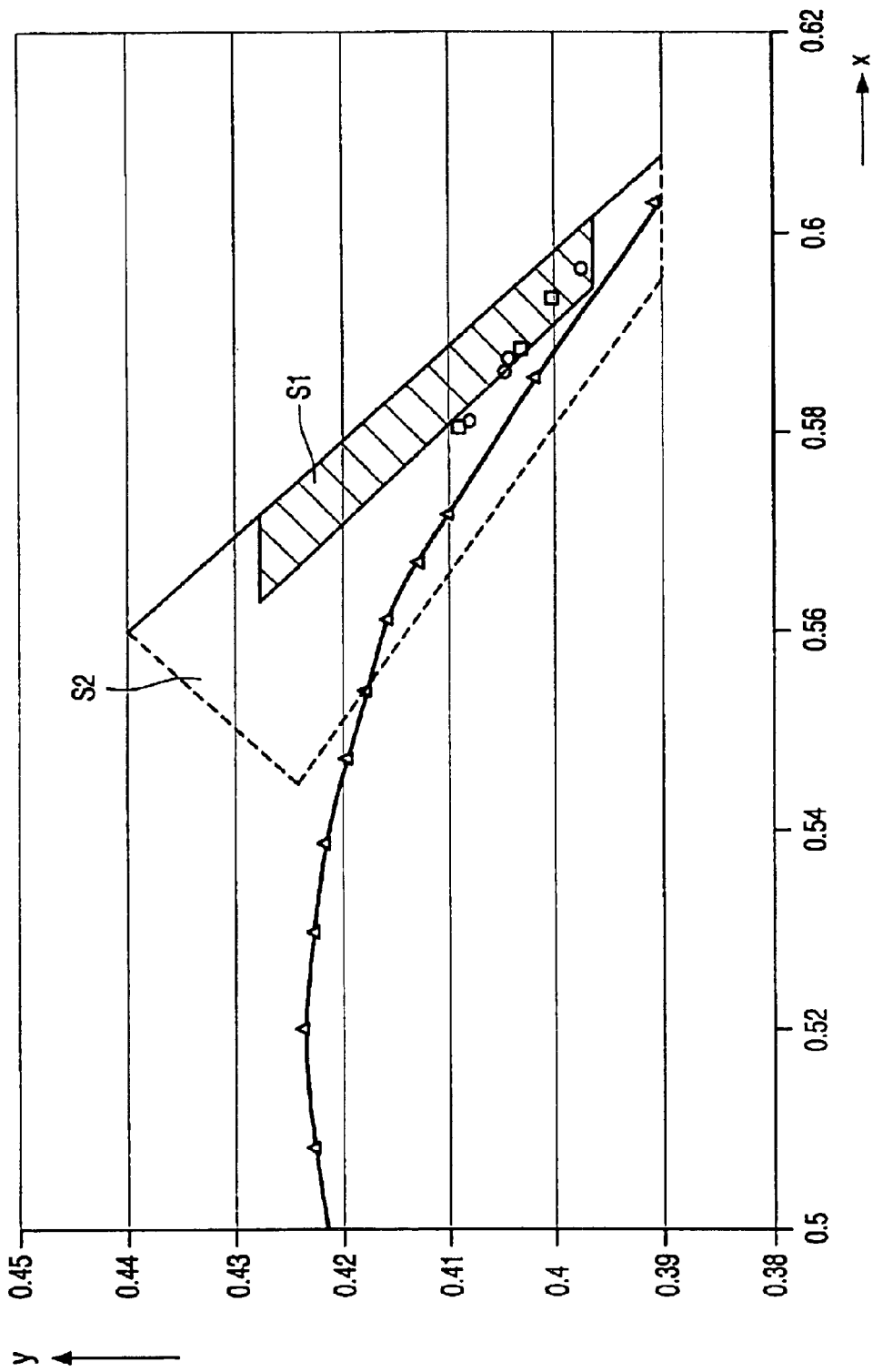
FIG. 3 shows, in a part of a C.I.E. 1931 color triangle diagram, the color coordinates of an electric lamp comprising a coating in accordance with the invention.

FIG. 3 shows, in a part of a C.I.E. 1931 color triangle diagram, the color co-ordinates (x;y) of an electric lamp with a light-absorbing coating comprising the above-described mixture of $ZnFe_2O_4$ and $Fe_2O_3$ (indicated by a circles in FIG. 3). The circle with the lowest x-coordinate corresponds to a layer thickness of the $ZnFe_2O_4/Fe_2O_3$ coating of approximately 2 $\mu$m. The circle with the highest x-coordinate corresponds to a layer thickness of the $ZnFe_2O_4/Fe_2O_3$ coating of approximately 3 $\mu$m. For comparison, the color point of a coating comprising only $Fe_2O_3$ is given for a range of layer thicknesses (triangles: variation in thickness from 1.5 to 3 $\mu$m in the hatched area). FIG. 3 also shows two specified areas in the color triangle, wherein the color point of an electric lamp used as an amber-colored indicator for an automobile should be situated. The hatched area referenced S1 corresponds to the European ECE standard for an amber-colored indicator, and the area referenced S2 corresponds to the American SAE standard for an amber-colored indicator, which standards are both known to those skilled in the art. The light-absorbing coating obtained which is applied to an electric lamp can suitably be used as an amber-colored indicator and passes the Fakra test known to those skilled in the art.

EXAMPLE 2

A quantity of 3 g $BiVO_4$ is dispersed in a 50/50% water/ethanol mixture, using "solsperse 41090" as the dispersing agent. The overall weight of the mixture is 23 g. By a wet ball milling using 2 mm zirconium oxide grains, a stable dispersion is obtained.

A quantity of 3 g $Fe_2O_3$ is dispersed in a corresponding manner.

A hydrolysis mixture of 40 g methyltrimethoxy silane (MTMS), 0.6 g tetraethyl orthosilicate (TEOS), 32 g water, 4 g ethanol and 0.15 g glacial acetic acid is stirred for 48 hours at room temperature and subsequently stored in a refrigerator.

A coating liquid is prepared by mixing 10 g of the $BiVO_4$ dispersion, 6 g of the $Fe_2O_3$ dispersion and 10 g of the MTMS/TEOS hydrolysis mixture with 4 g methoxy propanol, whereafter the coating liquid is spray coated onto the outer surface of the major part of a lamp vessel. The coating is dried for 20 minutes at a temperature of 160° C. In this manner, a light-absorbing coating in a thickness up to 3 $\mu$m is formed on a glass lamp vessel without crack formation during drying and curing.

An electric lamp provided with a light-absorbing coating made in accordance with the embodiment described herein is amber-colored and relatively free of light scattering, although the diameter of the bismuth-vanadate particles exceeds 100 nm.

After the electric lamp has burned for one hour, the color co-ordinate (x; y) for a light-absorbing coating thus prepared amounts to (0.592; 0.101), in accordance with the definition of the C.I.E. 1931 color triangle diagram, at an overall transmission of 50%. The color point of the coating remains stable during the service life of the electric lamp.

The coating obtained in accordance with the recipe has a thickness of at least substantially 3 $\mu$m. The weight fraction of the components in this coating is 21% $Fe_2O_3$, 21% $BiVO_4$, 17% solspers and 41% MTMS.

FIG. 3 shows the color co-ordinates (x;y) of an electric lamp with a light-absorbing coating comprising the above-described mixture of $BiVO_4$ and $Fe_2O_3$ (indicated by a the squares in FIG. 3). The square with the lowest x-coordinate corresponds to a layer thickness of the $BiVO_4/Fe_2O_3$ coating of approximately 2 $\mu$m. The square with the highest x-coordinate corresponds to a layer thickness of the $BiVO_4/Fe_2O_3$ coating of approximately 3 $\mu$m.

EXAMPLE 3

A quantity of 6 g P-doped $Fe_2O_3$ is dispersed in a 50/50% water/ethanol mixture, using "disperbyk 190" as the dispersing agent. The overall weight of the mixture is 32 g.

A hydrolysis mixture of 40 g methyltrimethoxy silane (MTMS), 0.6 g tetraethyl orthosilicate (TEOS), 32 g water, 4 g ethanol and 0.15 g glacial acetic acid is stirred for 48 hours at room temperature and subsequently stored in a refrigerator.

A coating is prepared by mixing 20 g of the P-doped $Fe_2O_3$ dispersion and 7 g of the MTMS/TEOS hydrolysis mixture with 8 g methoxy propanol, and the coating liquid is subsequently spray coated onto the outer surface of the major part of a lamp vessel. The coating is dried for 20 minutes at a temperature of 160° C. In this manner, a light-absorbing coating having a thickness up to 6 $\mu$m is formed on a glass lamp vessel without crack formation during drying and curing. The realization of such a relatively large layer thickness is possible because a relatively high concentration of pigment is applied at a relatively low concentration of MTMS.

An electric lamp provided with a light-absorbing coating manufactured in accordance with the embodiment described herein is red, transparent and free of light scattering.

After the electric lamp has burned for one hour, the color co-ordinate (x; y) for a light-absorbing coating thus prepared is (0.665; 0.335), in accordance with the definition of the C.I.E. 1931 color triangle diagram, at an overall transmission of approximately 20%. The color point of the coating remains stable throughout the service life of the electric lamp.

The specified color co-ordinates, including the color point of an electric lamp used as a red brake light for an automobile, are, in accordance with the European ECE standard known to those skilled in the art: x=0.665, y=0.335; x=0.657, y=0.335; x=0.7307; y=02613, and in accordance with the American NA-standard known to those skilled in the art: x =0.67, y=0.33; x=0.65, y=0.33; x=0.71, y=0.27. The color point of the electric lamp provided with a light-absorbing coating made in accordance with the embodiment described herein lies within the specified areas for red brake light.

It will be clear that, within the scope of the invention, many variations are possible to those skilled in the art. In the sol-gel process, many alternative preparation methods are possible. For example, for the acid used to hydrolyze use can alternatively be made of maleic acid. Furthermore, it is also possible to use pigment combinations to cause the color point to shift towards red. Besides, the color temperature of the light to be emitted by the electric lamp can be increased while, for example, the color co-ordinates remain substantially positioned on the black body locus.

The scope of protection of the invention is not limited to the examples given herein. The invention is embodied in each novel characteristic and each combination of characteristics. Reference numerals in the claims do not limit the scope of protection thereof. The use of the term "comprising" does not exclude the presence of elements other than those mentioned in the claims. The use of the word "a" or "an" before an element does not exclude the presence of a plurality of such elements.

What is claimed is:

1. An electric lamp, comprising:
    a light source (2) operable to emit a visible light;
    a light-transmitting lamp vessel (1) accommodating said light source (2) whereby the visible light propagates through said light-transmitting lamp vessel (1); and
    a light-absorbing coating (3) at least partially covering said light-transmitting lamp vessel (1) whereby the visible light propagates into said light-absorbing coating (3) from said light-transmitting lamp vessel (1), said light-absorbing coating (3) including
        an organically modified silane network, and
        a plurality of pigment particles dispersed through said organically modified silane network, said plurality of pigment particles including means for absorption characteristics absorbing a first portion of the visible light propagating through said light-absorbing coating (3) without generating a light scattering of a second portion of the visible light propagating through said light-absorbing coating (3).

2. The electric lamp of claim 1, wherein an average diameter of said plurality of pigment particles is less than 50 nm.

3. The electric lamp of claim 1,
    wherein said light-absorbing coating (3) is in liquid form prior to be coated on said light-transmitting lamp vessel (1); and
    wherein said liquid form of said light-absorbing coating (3) includes
        a hydrolysis mixture including said originally modified silane network, and
        at least one liquid mixture including a dispersion of said plurality of pigments wherein.

4. The electric lamp of claim 1, wherein said plurality of pigment panicles are dispersed throughout said organically modified silane network prior to at least partial covering of said light-absorbing coating (3) on said light-transmitting lamp vessel (1).

5. The electric lamp of claim 1, wherein said organically modified silane is selected from a group formed by compounds of the following structural formula R'Si(OR")$_3$,
    wherein R' includes at least one of an alkyl group and an aryl group, and
    wherein R" includes an alkyl group.

6. The electric lamp of claim 5, wherein the R' group includes at least one of $CH_3$ and $C_6H_5$.

7. The electric lamp of claim 5, wherein the R" group includes at least one of $CH_3$ and $C_2H_5$.

8. The electric lamp of claim 1, wherein a thickness of said light-absorbing coating (3) is equal to or greater than 1 $\mu$m.

9. The electric lamp of claim 1, wherein said organically modified silane network includes a plurality of silica particles.

10. The electric lamp of claim 9, wherein each silica particle has a diameter less than or equal to 50 nm.

11. The electric lamp of claim 1, wherein said pigment particles are inorganic pigment particles.

12. The electric lamp of claim 1, wherein said pigment particles are organic pigment particles.

13. The electric lamp of claim 1, wherein said pigment particles include a mixture of inorganic pigment particles and organic pigment particles.

14. The electric lamp of claim 1, further comprising:
a lamp housing (10) connected to said light-transmitting lamp vessel (1).

15. The electric lamp of claim 1, further comprising:
a reflector (30) for reflecting the second portion of the visible light to generate a directed beam.

16. An electric lamp, comprising:
a light source (2) operable to emir a visible light;
a light-transmitting lamp vessel (1) accommodating said light source (2) whereby the visible light propagates through said light-transmitting lamp vessel (1); and
a single layer light-absorbing coating (3) at least partially covering said light-transmitting lamp vessel (I) whereby the visible light propagates into said single layer light-absorbing coating (3) from said light-transmitting lamp vessel (1), said single layer light-absorbing coating (3) including
an organically modified silane network, and
a plurality of pigment particles dispersed through said organically modified silane network, said plurality of pigment particles for absorbing a first portion of the visible light propagating through said light-absorbing coating (3) without generating a substantial light scattering of a second portion of the visible light propagating through said light-absorbing coating (3).

17. The electric lamp of claim 16,
wherein said light-absorbing coating (3) is in liquid form prior to be coated on said light-transmitting lamp vessel (1); and
wherein said liquid form of said light-absorbing coating (3) includes
a hydrolysis mixture including said originally modified silane network, and
at least one liquid mixture including a dispersion of said plurality of pigments therein.

18. The electric lamp of claim 16, wherein said plurality of pigment particles are dispersed throughout said organically modified silane network prior to the at least partial covering of said light-absorbing coating (3) on said light-transmitting lamp vessel (1).

19. The electric lamp of claim 16, wherein said organically modified silane is selected from a group formed by compounds of the following structural formula: $R'Si(OR'')_3$,
wherein R' includes at least one of an alkyl group and an aryl group, and
wherein R'' includes an alkyl group.

20. The electric lamp of claim 16, wherein said pigment particles includes one of inorganic pigment particles, organic pigment particles or a mixture of inorganic pigment particles and organic pigment particles.

* * * * *